United States Patent [19]

Wohlhaupter

[11] 4,101,239
[45] Jul. 18, 1978

[54] BORING TOOL PROVIDED WITH A PAIR OF SEPARATELY ADJUSTABLE CUTTERS

[75] Inventor: Gerhard Wohlhaupter, Frickenhausen, Fed. Rep. of Germany

[73] Assignee: Emil Wohlhaupter u. Co., Frickenhausen, Wurtt, Fed. Rep. of Germany

[21] Appl. No.: 803,427

[22] Filed: Jun. 6, 1977

[51] Int. Cl.² .......................................... B23B 29/034
[52] U.S. Cl. .................................... 408/182; 408/233; 407/37
[58] Field of Search ............... 408/181, 182, 185, 153, 408/197, 147, 146, 233, 231; 407/37, 45, 46

[56] References Cited

U.S. PATENT DOCUMENTS

| 3,795,454 | 10/1971 | Elchyshyn | 408/197 |
| 4,043,697 | 8/1977 | Eckle | 408/182 |

*Primary Examiner*—Gil Weidenfeld
*Attorney, Agent, or Firm*—Hauke and Patalidis

[57] ABSTRACT

A blade-type boring tool having a body on an end of which is mounted a pair of separate and individually adjustable cutters. The cutters are preferably cutting inserts fastened on the side of holders having a mounting surface provided with V-shaped grooves mating a mounting surface on the end of the body provided with corresponding V-shaped grooves. Each holder is held in position on the end of the body by means of a mounting bolt or screw threading in an orientable retainer disposed in a transverse bore in the boring tool body.

8 Claims, 6 Drawing Figures

BORING TOOL PROVIDED WITH A PAIR OF SEPARATELY ADJUSTABLE CUTTERS

BACKGROUND OF THE INVENTION

The present invention relates to boring tools with adjustable cutters, and more particularly to a blade-type boring tool provided with radially adjustable blade cutters such as to bore in a workpiece a cavity of a predetermined diameter.

Blade-type boring tools adjustable in diameter are often made with blade cutters which are designed as the more complicated component of the assembly, while the body of the boring tool which supports the blade cutters is generally designed with relative simplicity. The blade cutters which are especially subjected to severe wear and tear must be frequently replaced, which presents a substantial economic disadvantage in view of the relatively high price of the blade cutters.

For example, it is known to provide boring tools with blade cutters which are provided with adjustment slots and adjustment screws and which are covered by a frontal plate into which the head of the mounting screws or bolts abut while the shaft of the screws is threaded into the tool body. The blade cutters are complex in design and are therefore expensive to replace when the cutters are worn. In addition, the blade cutters must be manufactured with very narrow tolerances in order to permit their insertion into the boring tool without binding in the frontal plate, which further increases their production cost. It is therefore the object of the present invention to provide a boring tool provided with a pair of individually adjustable blade cutters which are designed as relatively simple components but which still permit the boring tool to be adjustable in diameter with high precision.

SUMMARY OF THE INVENTION

The present invention accomplishes its objects by providing a boring tool body with a recess in the form of a bore disposed transversely to the axis of rotation of the tool, which accepts a pair of threaded retainers for the mounting screws, the threaded retainers being movable parallel to the direction of adjustment of the blade cutters, such that the mounting screws holding the blade cutters are disposed in slots formed in the tool body, and the longitudinal axes of the mounting screws are at an angle relative to the axis of rotation of the tool.

The structure of the invention accomplishes first of all the result that the boring tool body, which is practically not subjected to any wear and tear, is always reusable and is the more complicated element of the assembly, while the blade cutters, which are subject to extensive wear and tear, and are therefore the perishable portion of the assembly, are made in a very simple manner.

The many objects and advantages of the present invention will become apparent to those skilled in the art when the following description of some of the best modes comtemplated for practicing the invention is read together with the accompanying drawing wherein like reference numerals designate like or equivalent parts and in which:

DETAILED DESCRIPTION OF THE PREFERRED EMBODIMENTS

Figure 1:
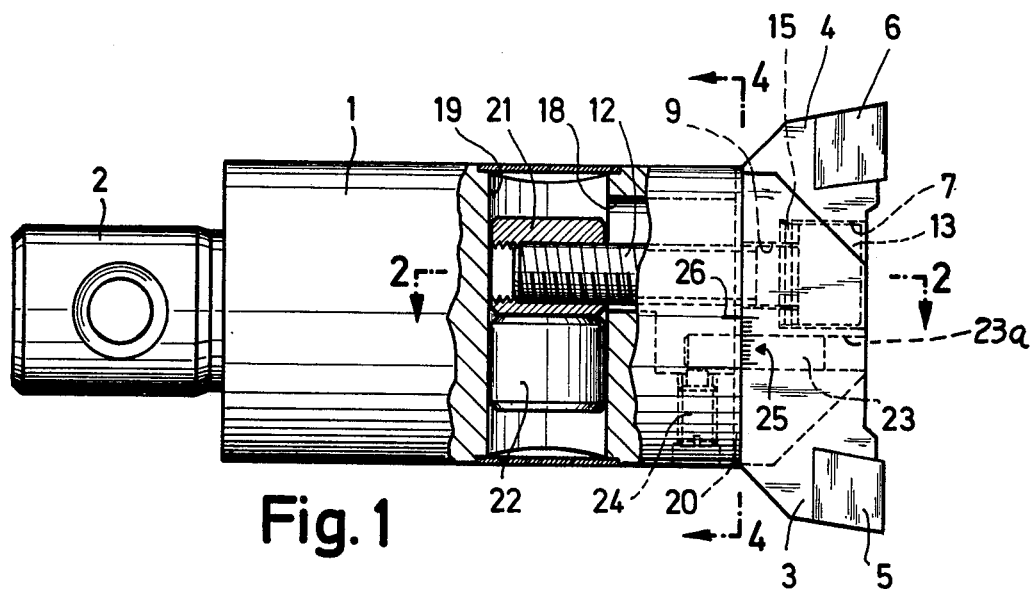
FIG. 1 is a side elevation view of a boring tool according to the present invention, with a portion removed for showing the internal construction.
Figure 2:
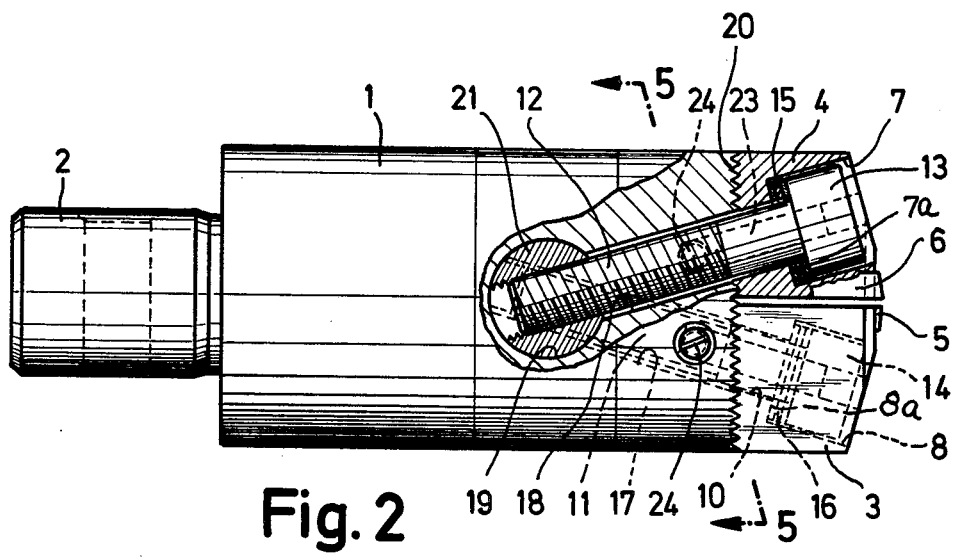
FIG. 2 is another side elevation view of the boring tool of FIG. 1, rotated 90°, with a partial section substantially along line 2—2 of FIG. 1.

Referring now to the drawing and more particularly to FIGS. 1-2 thereof, a boring tool according to the present invention comprises a body number 1 which is provided on one end with a reduced diameter portion 2 for mounting into the chuck or tool holder on the end of the rotatably driven spindle of a boring machine or the like, not shown. On the front end of the body member 1, opposite to the end provided with the reduced diameter portion 2, are mounted two adjoining blade cutters 3 and 4 which are laterally adjustable. In the illustrated example of the invention, the blade cutters 3 and 4 consist each of a blade or holder on the end of which is fastened a cutting insert such as cutting inserts 5 and 6, made of hardened tool steel, tungsten carbide or like material, each brazed in an appropriate pocket or held in the pocket by means of screws, clamps or the like, not shown.

Figures 3, 4:
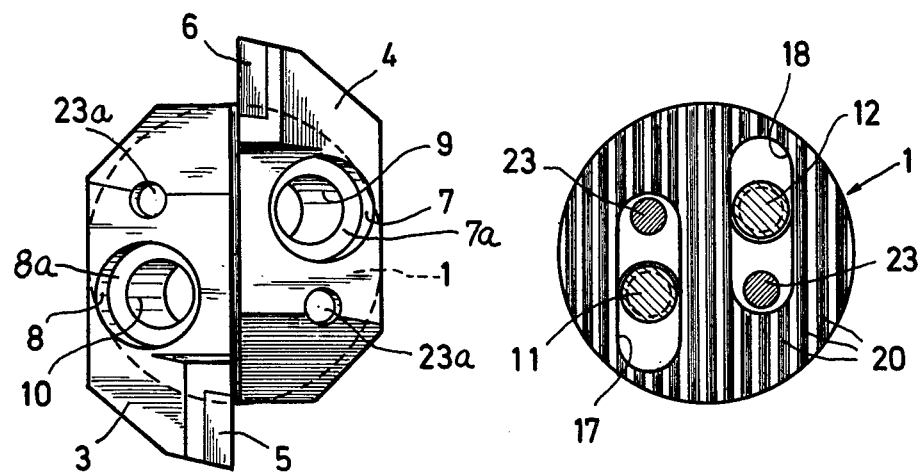
FIG. 3 is a partial front view thereof, with some parts omitted.
FIG. 4 is a transverse sectional view along line 4—4 of FIG. 1.

If so desired, the blade cutters 3 and 4 can each be made of a single piece of ultra-hard material provided with an appropriate cutting edge, mounted on the end of the body member 1. Whatever the structure which is adopted, as can best be seen from FIG. 3, the blade cutters 3 and 4 are provided with enlarged bores 7 and 8, respectively, disposed at an angle relative to the axis of rotation of the body member 1 which each has a reduced diameter bore portion 9 and 10, an annular shoulder 7a being formed between the bores 7 and 9, and an annular shoulder 8a being formed between the bores 8 and 10. The bores 9 and 10 accept respectively the mounting screws 11 and 12 whose heads 13 and 14, respectively, are located in the larger bores 7 and 8. Between the underside of the heads 13 and 14 and the annular shoulders 7a and 8a, respectively, are disposed spring washers 15 and 16, respectively. The mounting screws 11 and 12 are, as best seen at FIGS. 2 and 4, inserted into slots 17 and 18 formed in the body member 1 at an angle relative to the longitudinal axis of the body member. The lower ends of the slots 17 and 18 open into a transverse bore 19 whose axis is substantially perpendicular to the longitudinal axis of the body member 1, and a pair of holding nuts or retainers 21 and 22 are slidably disposed in the transverse bore 19. In the example of structure illustrated, the retainers 21 and 22 are provided each with a circularly cylindrical body slidably fitting the transverse bore 19, each having a diametrically disposed threaded bore into which the end of each of the mounting screws 11 and 12 is threaded.

As best shown at FIGS. 2 and 4, the end face of the body member 1 and the corresponding mounting surface of the blade cutters 3 and 4 are provided with complementary V-shaped grooves or knurls 20 which are aligned with the direction of adjustment of the blade cutters 3 and 4 such that, by loosening the mounting screws 11 and 12 to the point whereby the spring washers 15 and 16 still provide a certain amount of pressure applying the blades 3 and 4 against the end of the body member 1, the blades 3 and 4 can nevertheless be displaced laterally along the mating grooves 20, thus laterally displacing the mounting screws 11 and 12 within the slots 17 and 18, and sliding the retainers 21 and 22 along the axis of the transverse bore 19. After the blades 3 and 4 have been adjusted to a desired boring diameter, the mounting screws 11 and 12 which, preferably, are socket screws of the Allen type, are tightened, and the blades 3 and 4 are thus fixedly clamped at their appropriate position on the end of the tool body member 1.

In order to facilitate the fine adjustment of the radial position of the cutting edge of the blades 3 and 4, the blades 3 and 4 are each provided with a generally longitudinal bore 23a in which is press-fitted a pin 23 which projects into the slot 17 or 18. A set screw 24, disposed in a radial threaded bore in the tool body member 1 along an axis substantially parallel to the axes of the V-shaped grooves 20, has an end abutting the peripheral surface of the pin 23 proximate its end, such that by turning the set screws 24, the blades 3 and 4 can be radially adjusted to a predetermined diameter of boring.

The edge of each blade 3 or 4, is provided with a graduation scale, as shown at 25 at FIG. 1, which together with a reference line 26 formed at the edge of the boring tool body member 1 permits to set the blades to a precise position. The reference line 26 can be replaced, if so desired for greater precision yet, with a vernier scale.

Figures 5, 6:
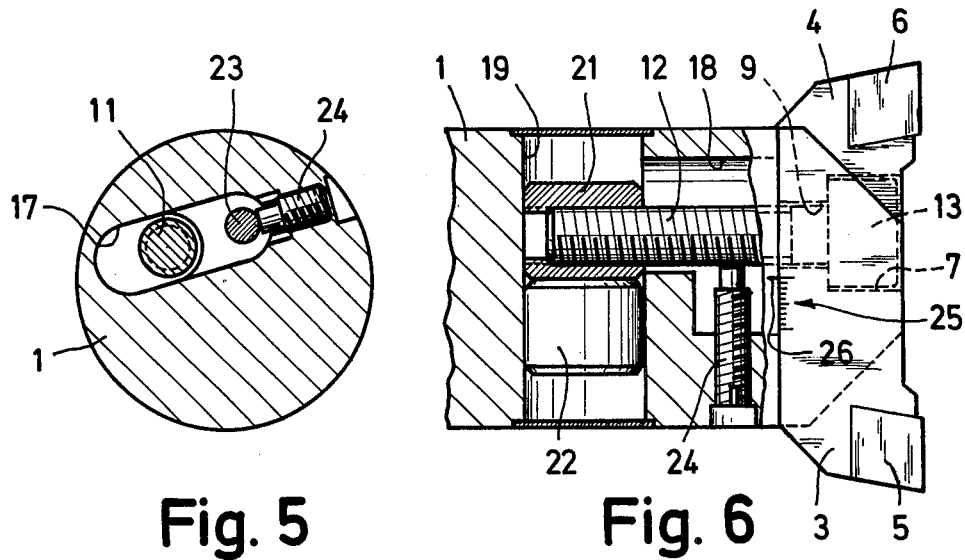
FIG. 5 is a generally transverse sectional view along line 5—5 of FIG. 2.
FIG. 6 is a partial side elevation view, with portions removed, of a modification of the boring tool of FIGS. 1-5.

FIG. 6 represents a relatively simplified structure wherein the adjusting set screw 24 has its end directly abutting the periphery of the appropriate blade mounting screw, that is, as clearly shown, the end of the set screw 24 directly abuts the periphery of the mounting screw 12 of the blade 4. In a similar manner, a second set screw 24, not shown, abuts the periphery of the mounting screw of the blade 3 to permit lateral adjustment of the blade.

As can be seen from the drawing and from the preceding description, the adjustable blades 3 and 4 are designed with a relatively simple structure requiring only drilling the bores 7–9 and 8–10 and, if so required, the bores 23a accepting the pins 23. Cut-out slots and adjustment screws, which are required in more conventional blade cutters are not required for the boring tool of the invention. In addition, the body member 1 can be manufactured quite easily since the diametrical bore 19 is a simple circularly cylindrical bore which nevertheless accomodates both retainers 21 and 22. Although no part forming the assembly of the invention is subject to close tolerances during manufacturing, a very precise adjustment of the positions of the cutter can be effected.

Having thus described the invention by way of examples of structural embodiments thereof, modifications whereof will be apparent to those skilled in the art, what is claimed as new is as follows:

1. In a boring tool having a pair of blade cutters diametrically and individually adjustable relative to the axis of the boring tool, wherein means are provided for slidably mounting said blade cutters on the end of the body of said boring tool and for guiding said blade cutters to permit displacement thereof along an appropriate diameter, the improvement comprising a recess formed in said body having an axis parallel to the direction of displacement of said blade cutters, a mounting screw for each blade cutter, slots in said body for accepting said mounting screws, each of said slots having an axis at an angle to the longitudinal axis of said body and the end of each of said mounting screws engaging a separate retainer slidably disposed in said recess.

2. The improvement of claim 1 wherein said blade cutter comprises a cutting insert mounted on the end of a holder mounted on the end of said body.

3. The improvement of claim 1 wherein said recess is a circularly cylindrical bore and said retainer has a corresponding circularly cylindrical body.

4. The improvement of claim 1 wherein said mounting screws have an enlarged head and spring washers are disposed between the bottom of said head and a surface of said blade cutter.

5. The improvement of claim 1 further comprising an adjustment set screw for each of said blade cutters having an end abutting the periphery of said mounting screw.

6. The improvement of claim 1 wherein each of said blade cutters has a radially directed abutment and a set screw is provided for engagement with said abutment for displacing said blade cutter diametrically.

7. The improvement of claim 6 wherein said abutment is in the form of a pin.

8. The improvement of claim 1 wherein said blade cutter and said body are provided with a graduation scale and a reference line for fine adjustment of said blade cutters.

* * * * *